Feb. 26, 1935. R. L. CARR Re. 19,476
VEHICLE BODY
Original Filed Feb. 27, 1926 4 Sheets-Sheet 1
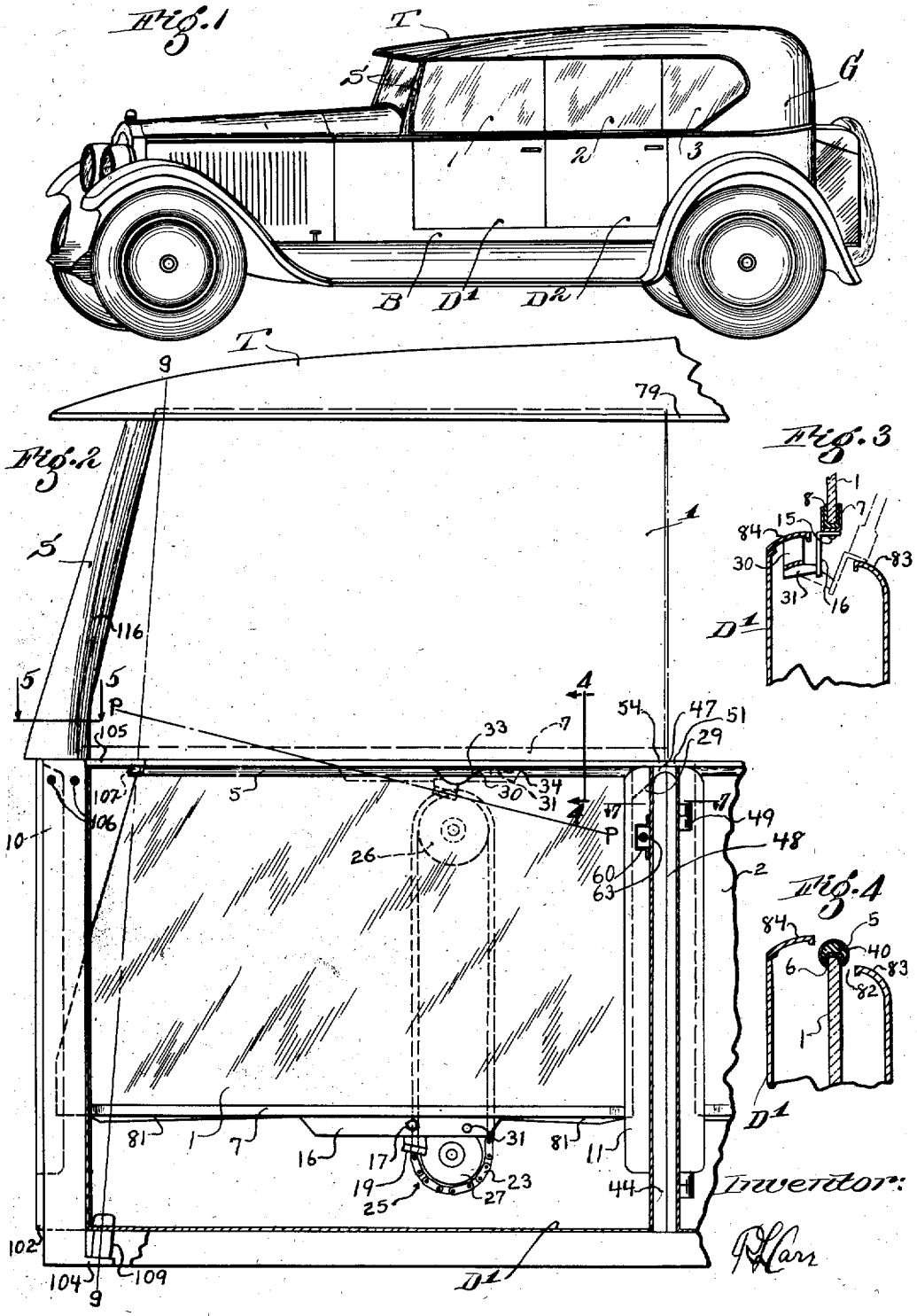

VEHICLE BODY
Original Filed Feb. 27, 1926 4 Sheets-Sheet 2
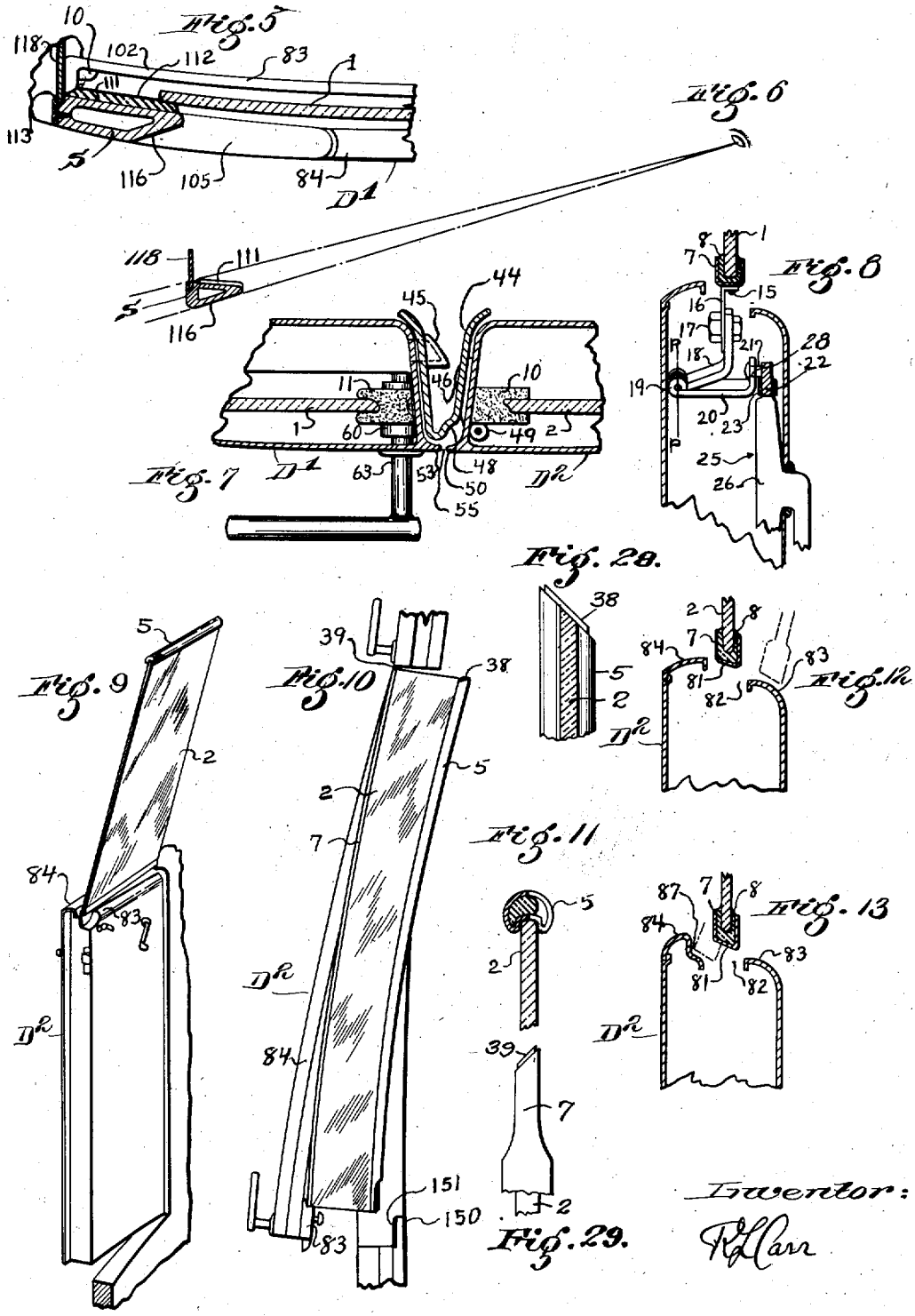

Feb. 26, 1935. R. L. CARR Re. 19,476
VEHICLE BODY
Original Filed Feb. 27, 1926 4 Sheets-Sheet 3
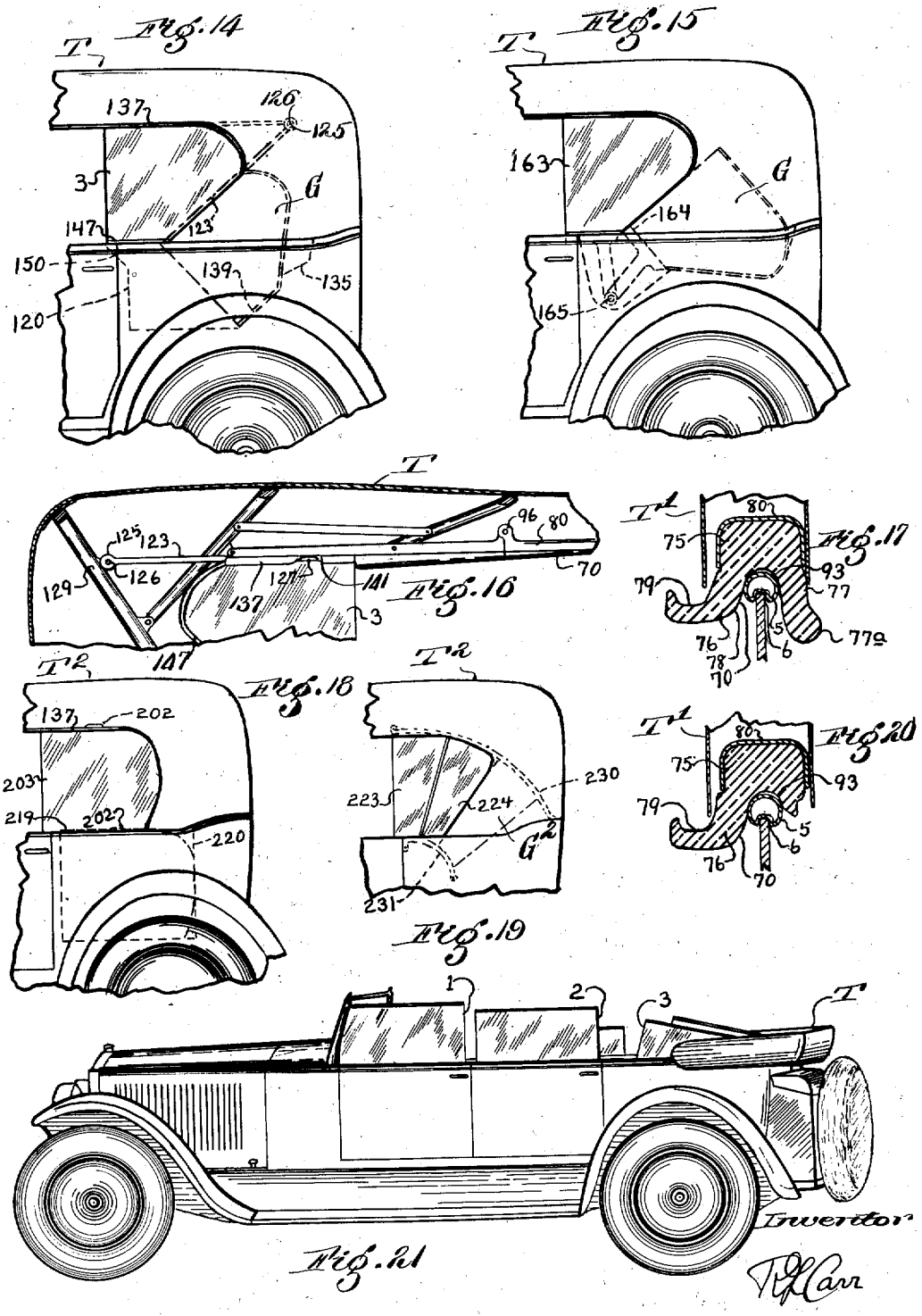

Feb. 26, 1935. R. L. CARR Re. 19,476

VEHICLE BODY

Original Filed Feb. 27, 1926 4 Sheets-Sheet 4

Inventor:
R. L. Carr

Reissued Feb. 26, 1935

Re. 19,476

UNITED STATES PATENT OFFICE 19,476

VEHICLE BODY

Raymond L. Carr, Boston, Mass.

Original No. 1,826,922, dated October 13, 1931, Serial No. 91,209, February 27, 1926. Application for reissue October 9, 1933, Serial No. 692,810

80 Claims. (Cl. 296—45)

The object of this invention is to provide a new type of vehicle body combining the advantages commonly associated with an open body with those which are characteristic of a closed body, and also including various structural improvements which, although peculiarly adaptable to this type of body, may also be used advantageously in various other body types. While my invention is more particularly designed for land vehicles, especially motor cars, certain features thereof may be found applicable to aircraft and boats.

If we compare the conventional phaeton, for example, with the corresponding type of closed car, the former is found to present the advantage of lighter weight and less rigidity in both body and top structure. Indeed the light top of the open car is often foldable, while such a feature is rare in inclosed bodies. The centre of gravity of the phaeton is generally lower, thus enabling the car to hold the road somewhat better than an inclosed vehicle. Furthermore the phaeton usually has a continuous, uninterrupted opening along the entire side of the body thereby affording the maximum opportunity for clear vision, while the absence of posts or uprights, other than the narrow windshield standards, tends to give the car a long, racy appearance which is unattainable in the conventional closed models. However, in the open car removable side curtains are inconvenient to apply and unsatisfactory in use, while, on the other hand, a closed body affords a snug weather-tight shelter for inclement weather as well as an easily variable degree of ventilation for more moderate conditions.

It is the purpose of my invention to combine these and various other advantages in one vehicle body. To this end I have provided a structure which may resemble a conventional phaeton in appearance and which may be provided with any common type of top. Suitably concealed about this body are closure panels which can readily be moved to operative position, the vehicle being thereby converted into a closed car. This change can be made with a facility and ease comparable to that afforded in adjusting the windows of a closed car, and any desired degree of ventilation may be effected in a similar manner.

It is likewise an object of my invention to dispense with permanent posts or uprights along the side of the body, except for the windshield standards or uprights, and to form the latter so that they will permit an unusually high degree of visibility. While movable posts may be employed or the transparent panels may have marginal frame along their vertical edges, such members are omitted in the preferred form of my invention, so that the panels may form a continuous transparent wall along the side of the body. To permit such an arrangement means are provided whereby panels may be concealed in swinging doors and yet neither be limited in location or dimensions by the location or dimensions of the door openings, nor at any time interfere with the free swinging of the doors. Instead of heavy and comparatively rigid supporting frames with the accompanying rigid understructure, spaced resilient means are used to reinforce and hold the panels in operative position, thus insuring a weather-tight enclosure, but permitting a light and relatively flexible body wherein considerable weaving or twisting is not objectionable.

Numerous other advantages and novel features attributable to the invention will readily appear to those skilled in the art upon a reading of the subjoined description and claims in conjunction with the accompanying drawings, wherein:

Figure 1 is a perspective view of a motor car in which my invention is incorporated;

Figure 2 is a side elevation of the front door and adjacent parts of the vehicle, with the outer body wall removed;

Figure 3 is a sectional detail showing a portion of a door and the corresponding closure panel;

Figure 4 is a section on line 4—4 of Figure 2;

Figure 5 is a section on line 5—5 of Fig. 2;

Figure 6 is a diagrammatic view showing the relation of the windshield standard to the eyes of the driver;

Figure 7 is a section on the line 7—7 of Figure 2;

Figure 8 is a sectional detail showing the connection between a closure panel and its lifting mechanism;

Figure 9 is a perspective view of the rear door and associated parts with the former shown as swung partially open;

Figure 10 is a top plan view of the structure shown in Figure 9 with adjoining parts shown;

Fig. 11 is a sectional detail of the upper corner of a closure panel;

Figs. 12 and 13 are sectional details of portions of the doors and closure panels, taken respectively near the rear and front ends of these members;

Figure 14 is a side elevation of the rear portion of the vehicle body;

Figure 15 is a similar view of an optional arrangement;

Figure 16 is an elevational view of a portion of the inside of the top with the lining removed;

Figure 17 is a sectional view of a fragment of the rear upper portion of a panel and its holding means;

Figures 18 and 19 are views similar to Figure 14 of other forms of the invention.

Figure 20 is a sectional view similar to Figure 17 but located at the front end of the panel;

Figure 21 is a perspective view of a vehicle in which my invention is incorporated, the vehicle top being folded;

Figure 24:
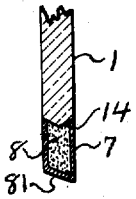
Figure 27:
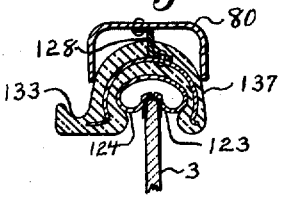
Figure 25:
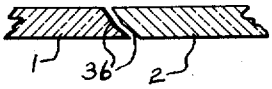
Figure 26:
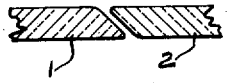

Figures 24, 25, and 26 are sectional details of the edges of closure panels; and Fig. 27 is a sectional detail of the top of the rear panel and its holding means.

Fig. 28 is a detail sectional view of the upper corner of one of the closure panels showing the under portion of the molding upon the top of the panel; and Fig. 29 is a detail bottom view of one end of a closure panel.

Figure 1, which represents the incorporation of my invention in a body of the open phaeton type, should be considered as only illustrative and not as limiting the scope of the invention, since the principles thereof may be applied to different body types in a wide variety of ways. As shown in Figure 1, the body B closely resembles a conventional phaeton in appearance, having tilted windshield standards S, two doors D1 and D2 along its side, and a top T with gypsy or rear quarter curtains G. The top T may be foldable or permanent, preferably the former. While I have shown three closure panels 1, 2 and 3, it will be evident from the subsequent description that the number and arrangement of the panels may be varied to suit the individual designer.

The panels 1 and 2, carried respectively by the front and rear doors D1 and D2, are similar in form and mounting, so that a description of the panel 1 will also suffice in most respects for the panel 2. The body of the panel 1 preferably comprises a good quality of plate glass, although so-called "safety glass", sheet glass, celluloid, or similar materials may be used. The front and rear edges of the panel are preferably left unbound, while its upper margin is reinforced by a light metal molding 5 having a rounded or convexly curved outer wall and carrying a thin cushioning strip 6 cemented between it and glass 1, as illustrated in Figures 17 and 20. The section of the metal in the molding 5 is so proportioned that it will limit but not entirely prevent the natural flexing of the glass under strain. The panel 1 is supported in the channeled holder 7, which is also formed of thin resilient metal, a suitable filling medium 8 such as rubber, being secured between the panel and the panel holder. The transparent plate 1 preferably has a slight horizontal curvature substantially corresponding to that of the outer surface of door D1. Not only does such an expedient enable the closure panels to form a smooth continuous wall which conforms closely to the shape of the body, but this inherent curvature tends to stiffen the panels along their vertical extent and in combination with the horizontal reinforcing members 5 and 7 enables the panels to be considerably stronger and stiffer than flat plates, although at the same time retaining a degree of the resiliency which is characteristic of the latter.

While the upper portion of the front edge of panel 1 is inclined substantially at the same angle as that of the windshield standard, the lower portion thereof and the rear edge of the panel run in vertically extending guideways 10 and 11 respectively. The guideways are channeled to fit the edges of the panel in the conventional manner and are secured to the front and rear walls of the door, terminating just below the top thereof. In order to permit sliding in the members 10 and 11, the panel holder 7 has its ends reduced in thickness to conform with the corresponding portions of the panel 1, as shown more particularly in Figure 24. The extremities of the lower edge of the panel are tapered upwardly slightly so that its ends are approximately alined with the top of the holder 7, the filler 8 being correspondingly increased in depth at these points with the shallow grooves 14 receiving portions of the panel keyed therein (Figure 24).

The bottom of the panel holding channel 7 is secured by suitable fastening means 15 upon the horizontal wall of the right-angled bracket 16 (Figure 8), while the depending wall of this bracket is secured, as by a detachable fastening 17, to a vertical extension of the upper leaf 18 of the hinge 19. A similar extension of the lower leaf 20 is pivotally supported by the stud 21 which projects laterally from the block 22, the latter forming a link of the chain 23 in the window lifting mechanism 25. The arrangement of this window lifting mechanism with its upper and lower sprockets 26 and 27 is conventional, except that the opening 28 in the member 20, which engages the stud 21, is somewhat restricted in its longitudinal extent. During movement of block 22 over sprocket 26, a longitudinal as well as vertical movement is therefore imparted to the panel 1 by the operation of the lifting mechanism 25. The above-described parts are proportioned and located so that when the stud 21 is thus moved to approximately its upmost position above the centre of the sprocket 26, the panel 1 will be located with its lower edge substantially on a level with the top of the door D1, with the holder 7 visible thereabove and with the rear portion of the panel slightly overhanging the end of the door. To permit this longitudinal movement of the panel at the top of its vertical path, the bight portion of the channeled guide 11 is cut away at its upper end and a corresponding opening is formed in the rear wall of the door D1, the former being indicated at 29 in Figure 2.

Since the pivot stud 21 is located nearer to the rear than the front edge of the panel, the latter portion thereof would tend to swing downwardly when the endwise support of the guides 10 and 11 was rendered ineffective due to the panel's longitudinal movement. To counteract such a tendency, I have provided the metal guiding strip 30 which is secured at its ends to the top wall of the door by welding or other suitable means and which is designed to be engaged by the follower 31 projecting laterally from the rear portion of the bracket 16 (Figures 2 and 3). The strip 30 has a section adjacent its front end which extends downward and merges into an upwardly and rearwardly curved portion 33, shaped approximately to parallel the path of the stud 21 during its rearward movement; this portion 33 in turn terminates in a sharply down-curved hump 34 adjoining the rear end of the strip. The various parts are arranged so that the follower 31 will engage the curved portion 33 at the upper end of the its vertical path. During the rearward movement of panel 1, the weight of its front end will hold the follower 31 against this curved portion; the members 21 and 31 following substantially parallel paths, and thus holding the lower margin of the panel in an approximately horizontal position. Finally, if other means have not intervened, the hump 34 serves as a positive stop for the follower 31 and the entire mechanism so that the stud 21 is prevented from going substantially beyond its upmost position.

The panel 2 is mounted in the same general manner on door D2 as the panel 1 on door D1 with the exception that the front edge of the former is vertical for its entire length, instead of being inclined to clear the windshield, and that the rear window lifting mechanism is arranged so that the panel 2 is slid forward at the end of its upward movement. While it is of course feasible to have a middle body panel between the doors D1 and D2, with a corresponding closure panel or panels supported thereby, I prefer to omit such an arrangement and have the panels 1 and 2 moved directly into overlapping relation, thereby obtaining a simpler and neater appearing assembly. For this purpose the adjoining vertical margins of the panels 1 and 2 are each formed with a bevel 36 which has two surfaces at a slight angle to each other, as may be seen in Figure 25, the front level being arranged to overlap that of the rear panel. The provision of such angled surfaces rather than straight beveled edges, as suggested in the modified arrangement of Figure 26, has the advantage of better weather protection. While the panels may be provided with square-ended overlapping margins, such an expedient will make the closure wall broken in appearance. The beveled surfaces 36 are preferably not brought into abutting relation, but normally have a small clearance space 37 therebetween. For this purpose the rubber fillers 40 in the ends of the moldings 5 are slightly extended to form bumpers 38 for the upper margins of the panels 1 and 2, while the fillers 8 in the lower strips 7 are similiarly extended at 39; these members having their ends beveled to correspond with the shaping of the panel edges. It is to be understood that the extension 39 of the lower filler is so slight in each case that it does not appreciably hinder the sliding of the panel holders 7 in the channeled guides 10 and 11. If either panel is fully raised, it will act as a stop for the other panel at the end of the latter's path, otherwise the last named member will continue along the substantially horizontal portion of its journey until arrested by the hump 34, Since there is no exactly defined limit to the movement of the panels, inaccuracies in workmanship and normal body strains are rendered unobjectionable.

In order that the longitudinal paths of the panels 1 and 2 may be relatively short, I have interposed between the doors D1 and D2 a door post of extremely narrow design. Such a member is shown in Figures 2 and 7, from which it is apparent that the sheet metal post 44 is restricted in width and has a modified U-shape in cross-section, being provided with a recessed portion 45 for engagement with the latch of the door D1 and fastenings 46 for the hinges 49 of the door D2. The post 44 does not extend to the full height of the doors, a clearance space 47 being left for the adjoining corners of the closure panels. A vertical extending recess 48 in the post is designed to accommodate the extension 50 of the outer surface of the door D2 when the latter is swung open. This extension 50 of the outer surface and the extension 51 of the top rail of the door D2 meet the similar extensions 53 and 54 respectively of the door D1 with only a narrow clearance line 55 therebetween. The post 44 is therefore practically concealed behind these extensions of the adjoining top and side walls of the two doors.

As a further expedient for reducing the longitudinal extent of the paths of panels 1 and 2, I have made special provision for the compact installation of the latch handle shaft at the rear of door D1.

For this purpose a suitable recess is provided in the guideway 11 with a U-shaped piece of thin metal 60 located therein and having a thin section of the material of the guideway disposed between its bight portion and the adjoining edge of the panel 1. With only a slight clearance at either side the latch handle shaft 63 is inserted between member 60 and the end of the door as shown in Figures 2 and 7.

Since the panels 1 and 2 are separated from each other when in a partially raised position, pounding or rattling therebetween is avoided. However when they are fully raised, it is desirable to have positive holding means for their upper margins, not only to prevent them from pounding against each other, but to hold them in relation to the top and to each other so that a weather-tight structure is assured. Such holding means should be designed to permit the free swinging of the doors. To this end I prefer to provide for each panel a supporting hinge 19, which cooperates with holding means 70 adjacent the outer wall T1 of the top T.

As may be seen by reference to Figures 2 and 8, the hinge 19 has its pivot line or axis *p—p* preferably off-set outwardly from the plane of the closure panel and also inclined upwardly towards the front. The hinge 19 is designed to prevent the panel from swinging outwardly much beyond an upright position, while the upper and lower leaves 18 and 20 are normally located at such an angle with each other that they limit inward swinging of the panel. The follower 31 has a curved surface in engagement with the strip 30 to permit such a movement as may be seen in Figure 3.

Each pivot line *p—p* is situated so that when either panel swings inwardly with relation to its respective door, the lower rear corner thereof is moved downwardly and inwardly from its original location while the lower front corner thereof is moved downwardly and outwardly from the position which it first occupied, the outward movement of this corner being less than the inward movement of the first-named corner. The upper edge of the panel is of course swung downwardly and inwardly, its rear portion having a longer inward path with a relatively smaller downward component than its front end. In Figures 9 and 10, the panel 2 is shown as swung in the above-described relation to the door D2, it being understood that the panel 1 is arranged similarly in respect to the door D1.

The relation of the lower edge of the panel to the top of the door is shown in Figures 3, 12 and 13, wherein the dotted lines indicate the inclined position of the panel holder 7 and a fragment of the panel itself. Between the inner and outer sections 83 and 84 of the top rail of each door, the comparatively wide clearance space 82 provides room for the swinging of members 7 and 16, while it accommodates the member 5 when the panel is fully lowered. The lack of alinement between the higher surface of section 84 and the lower surface of section 83 is thus rendered unobjectionable in appearance by the rounded wall of the member 5 interposed therebetween (Figure 4).

As may be seen from Figure 12, the rear portion of the holder 7 has its outer side extending somewhat below the level of the outer door rail section 84, while its bottom has a beveled surface 81 sloping downwardly toward its inner side to provide weather protection. When the panel is swung inwardly the surface 81 is swung out over the inner rail section 83. As may be seen from an inspection of Figure 3, the mid-portion of the holder 7 has a square-cornered edge, the depending wall of the bracket 16 helping to form a weather-tight joint at this location. The front portion of the holder 7 (Figure 13) has a beveled bottom edge 81 similar to that of the rear portion. A groove 87 in the inner part of the section 84 of door D2 accommodates the front end of the holder 7 upon the swinging of the panel 2, such an expedient being unnecessary in door D1, due to differences in design that will presently be explained.

The holding means for the upper margin of each panel consists of an irregularly shaped channel member, preferably with differing degrees of resiliency in various portions of its walls. Such a member may be of thin metal covered with fabric or rubber cushioning material, but preferably it consists of a channeled rubber block reenforced by an outer metal channel member in the manner shown in Figures 17 and 20. The metal channel 80 may preferably comprise one continuous member holding the rubber channels 70 for both of the panels and it preferably forms a portion of the top framing such as one of the main longitudinal members of the out-rigger portion of the top. If the top is foldable, obviously the channel 80 may be provided with a suitable hinge 96, and there may be a break in the rubber member 75 at the pivot. However, in the succeeding description I shall refer to the rubber channel as if it were a unit for each panel, although it may obviously be broken at various points or the two adjoining rubber channels may constitute one continuous unitary member.

The upper part of the block 75 is firmly held between the depending legs of the metal channel, and itself has depending walls 76 and 77 of varying configuration to form an irregularly shaped channel 70. As may be seen from Figure 17 the outer wall 76 of the rubber channel 70 is rather stiff toward its rear end, its lower margin having a slight flare outwardly at 78 which merges into the curved lower wall of the gutter 79. Toward the front of the channel, wall 76 is somewhat stiffer with the gutter 79 continued therealong. At its rear end the inner wall 77 has an inwardly flared lower portion 77*a*, which extends downward somewhat below the remainder of the channel. This portion of wall 77 tapers towards its forward end into a light flexible rubber ridge, as may be seen in Figure 20. The groove 93 of channel 70 has a longitudinal curvature corresponding to that of the closure panel, while the molding 5 will fit therein rather firmly with the rubber walls flexed slightly outward. Obviously the entire assembly is curved to conform to the shape of the outer wall of the top, and ordinarily may be located between the outer top covering and the lining. If portions of the rubber channel are broken to permit folding of the top or the like, the adjoining ends of the rubber gutter sections preferably are adapted to be slightly compressed when in their alined position in order to form a continuous trough.

By the time that the lower edge of either panel is raised out of the guideways 10 and 11, the molding 5 will be engaged by the flared portion 77*a* of the wall 77, the curved shape of this section cooperating with the corresponding portion 78 of the outer wall 76 to guide the molding into the groove 93. The molding 5, which is quite firmly held at its rear end between the walls 76 and 77, serves to stiffen the front of the panel which it but lightly supported on its inner side by the adjoining flexible wall. When the vehicle door is swung open, the hinge 19 comes into play and the panel is swung in the manner that has been described. The rear part of the molding 5 moves downward and slightly outward due to the curvature of the wall 76, while the other end of the molding swings inward past the flexible portion of the wall 77. As a result of the location of the axis *p—p*, the molding 5 is swung so that it is in intermediate position between being parallel to the top of the partially opened door or parallel to the groove 93. Since its front end has a shorter inward movement with a greater downward component than would be the case were the axis *p—p* horizontal, the wall 77 can be made stiffer for a greater part of its length than would otherwise be possible. The off-set position of hinge 19 also permits the path of member 5 to have a greater downward component, as a result of the opening of the vehicle door, such an effect being augmented at the ends of the panel due to its curvature. It is evident that the round form of the member 5 enables it to turn and slide readily in the groove 93 with the minimum of resistance and strain upon the glass. At the bottom of the swinging panel the opening of the door provides plenty of clearance for the inward movement of the rear corner in relation to adjoining members, while the relative movement of the adjoining parts coupled with their resiliency permits the more restricted outward movement of the lower front corner.

In order to have a weather-tight joint at the front of panel 1, it is necessary to provide overlapping means of some sort, which preferably will constitute part of the windshield assembly, and which may either be a fixed or movable glass panel, forming an auxiliary windshield, or the windshield standard itself. Due to its more attractive appearance and greater simplicity, I prefer the latter arrangement. The windshield itself may be either vertical or tilted, the latter position being preferred from the point of view of trimness and of greater visibility afforded the driver. In order to give this portion of the body a pleasing appearance I have rabbeted the door D1 to form an extension 102 which is normally disposed behind the rear margin of the front body panel and which carries the channeled guide 10 and the front portion of panel 1, thereby permitting the visible front edge of the door and the rear edge of windshield standard S to be alined. However, it is structurally feasible to locate the outer front edge of the door at either side of this position. A lower part of the windshield standard S preferably comprises the rear frame member for the front body panel and extending rearwardly from the windshield standard S as thus arranged are two arms 104 and 105. The latter is disposed at the top of the door and is preferably designed to resemble a continuation of the outer section 84 of the door rail, the front of which is depressed to fit under the arm 105 and is reduced in width to provide a clearance for the front corner of the panel 1 similar to that provided by the groove 87 of the rear door. The rear end of the arm 105 has a downwardly extending stud 107 pivotally engaging a thimble formed in the depressed portion of the rail section 84, while the front end of the arm is detachably secured to the standard by fastenings 106. The lower arm 104 is relatively short and may be made integral with the lower part of the windshield standard; it being provided with an upwardly extending stud 109 at its rear end which engages a thimble in the lower wall of the door D1. The inclined pivot line *g—g* formed by members 107 and 109 will therefore fall to the rear of the windshield standard S, permitting the forward portion of the panel 1 to swing inwardly away from the standard when the door D1 is opened and at the same time leaving a normal clearance at the bottom of the doorway.

To form an abutment for the front margin of the panel in its various raised positions, the inner wall 111 of the windshield standard S is provided with a cushion 112 of resilient rubber, which is designed to give slightly when the panel is moved longitudinally, or when the lower corner thereof is moved outwardly due to the swinging of panel 1 about the hinge 19. The lower margin of the member 112 is tapered to engage the upper portion of the panel when the upward movement of the latter is begun, while the inner side of the adjoining part of molding 5 is cut away substantially in the manner shown in Figure 11, to assist such a movement and to enable the glass to bear directly against the cushion 112.

The windshield standard itself has been designed so that it offers a minimum hinderance to the driver's vision; a windshield standard assembly of this general type is disclosed and claimed in my copending application, Serial No. 360,105, filed May 3, 1929. It is desirable to have the wall 111 overlap panel 1 throughout the latter's rearward movement and the limited extent of this movement therefore enables the standard S to be correspondingly restricted in dimension. The surface of the outer wall 116 of the standard is substantially alined with the normal line of sight from the driver's eyes toward the rear edge of wall 111; the bulk of the metal being located outwardly from the front part of the latter wall (Figure 6). The edge of the windshield glass 118 is held in a groove 113 spaced outwardly from the front margin of wall 111 so that the front and rear edges of this wall will substantially define the outer margins of the standard S as viewed by the driver. At the level of the driver's normal line of vision, the cross-section of the standard is substantially triangular in shape with the short side toward the front, the wall 116 forming the longest side, and the wall 111 forming the third side. Especially adjoining its base the outer front corner of the standard may be flattened or rounded to improve its appearance, if desired. Although the glass 118 is shown as fixed in the groove 113, its may readily be made slidable therein or swingable forward without altering the relative position of the parts or interfering with the driver's vision.

In the preferred embodiment of my invention a rear panel 3 is designed to fill the space between the curtain G and the panel 2. As may be seen in Figure 14, a pocket 120 is formed in the rear portion of the body side with a diagonal rear wall 139 parallel to the front edge of the curtain G and adapted to support the lower margin of panel 3 in its inoperative position. At the upper part of the wall 139 is an extension 135 of pocket 120, while the space between the curtain G and its lining forms a continuation of the pocket. The panel 3 has its upper margin secured in a molding 123 which is provided with shoulders 124 on its lower side. A rearward extension of this molding is formed into a bearing 125 pivotally engaging a stud 126, which is secured to the main bow 129 or other portion of the top framework. When the panel 3 is lowered, this molding forms a finish strip for the edge of the curtain G, with an intermediate handle 127 extending inwardly adjoining the curtain edge which comprises means whereby the panel may be slid in a circular path with the molding 123 turning about stud 126. The molding is held in its raised position adjacent the lower edge of the top portion T1 by channel 137, which preferably is formed of resilient metal covered with rubber, as may be seen in Figure 27. The lower portions of the walls of the member 137 are adapted to be spread apart in a cam-like manner by the curved surface of the upwardly moving molding 123 but to spring inwardly to grip its shoulders 124 when it is entirely lodged in the channel. The channeled member 137 is secured to the frame of the top in any suitable manner as by brackets 128 and has its outer wall provided with a gutter 133 which forms a continuation of the gutter portions 79. The inner channel wall is broken away at 141 to provide access to the raised handle 127, Fig. 16.

The lower end rear margins of panel 3 are preferably bound in a light channeled strip 147 similar to and alined with the members 7, said trip having its forward lower surface provided with a bevel slanting upward and outward, so that, if the panel 2 is being lifted when the panel 3 is in operative position, the former will be guided past the latter. Such an operation may easily take place due to the flexibilty of the panels. To assist relative movements of this character, the adjoining portions of the inner and outer surfaces of moldings 5 and 123 respectively are cut away and provided with rubber cushions protruding both slightly sidewise and endwise. Figure 11 shows such an arrangement at the end of molding 5. The sidewise bulge on the rubber cushions prevents the panels from rubbing against each other when being moved and keeps them from rattling when the panel 2 is partially raised in relation to the panel 3. The endwise rubber extensions form abutments for the upper moldings when both panels are raised, while the strips 7 and 147 have corresponding extensions for the lower portions of the panels. The adjoining edges of the panels 2 and 3 are beveled in the manner previously described with reference to panels 1 and 2.

To permit the swinging of the panel 3, there is an opening in the upper part of the front wall of the pocket 120 and its inner wall is extended at 150, the door D2 being cut away to fit this extension. Upon this overhanging portion of the pocket wall is a rubber cushion 151 designed to press the lower corner of the panel 3 outwardly to prevent rattling, but adapted to be compressed when the relative positions of the panels 2 and 3 require such a condition.

Figure 21 shows how the panels 1 and 2 may serve as wind breaks, when the folding top T is lowered, it being understood that the panels may be raised to within approximately two inches of their maximum height when functioning in this manner. By the pivotal movement of the rear bow 129 the panel 3 may be swung to approximately the position illustrated, with its rear end supported in the extension 135 of pocket 120, its lower part concealed in the pocket and its upper edge disposed at an inclination as shown. I have now shown how a vehicle body may be made to retain the folding top, advantageous weight distribution, and relative flexibility of an open body, but may, however, be readily convertible from an open to a closed body or provide any degree of ventilation between these extremes, and may have a clear vision space along its entire side, whether the same is open or closed, so that it always resembles an open body in appearance and degree of visibility afforded.

It is evident that the foregoing principles of construction may be widely varied to suit different conditions and individual body styles, and that the foregoing description is only illustrative. It is to be further understood that the subsequent description of modifications of my invention should in no sense be considered as exhaustive, but merely as indicating further possible phases of the invention.

In Figure 15 is shown a modified manner of supporting a rear panel 163 which is shaped similarly to the panel 3, but has its base supported by a bracket 164 which is pivotally mounted in the body wall as indicated at 165. Panel 163 is adapted to swing around pivot 165 as a centre, following a path the curvature of which is oppositely disposed to that of the panel 3, and in its inoperative position being located with its forward edge in juxtaposed relation with the diagonal edge of the curtain G. Obviously with this arrangement the panel would remain in its inoperative position when the top was lowered. Any suitable locking means may be provided either for the bracket 164 or for the panel in order to hold the latter in its raised position.

Figure 18 shows a modified arrangement for a rear panel 203. Such a design is advantageous when the conventional gypsy curtain is not used, and when there is either room for a deep pocket in the body panel or it is not desired to entirely lower the window. The window 203 may be of any shape and is designed to be lifted vertically out of its pocket 220 and then be moved slightly forward. Secured to the upper margin of member 203 is a molding 219 similar in form to the molding 123 and likewise provided with a lifting handle 202 at its mid-point. The molding 219 is engaged by a channel 137 similar to that of Figure 27, the mid-section of the channel being broken away to accommodate the handle. Obviously such an arrangement may be useful in bodies having one door at their side. A lifting mechanism similar to that provided for panels 1 and 2 may be used for the panel 203 instead of the handle 202.

Figure 19 shows another method of mounting the rear paneling, the panels 223 and 224 being slidable along a curved path similar to that of Figure 15. To this end the tracks 230 and 231 which may comprise parallel juxtaposed channels support the upper and lower margins of the two panels. In this case the panels 223 and 224 are concealed side by side behind the narrow gypsy curtain G2, but obviously in certain cases one panel might be installed in a similar manner. Both panels may be moved to their overlapping operative position, as shown, or one panel may be left in its concealed position allowing a degree of ventilation. If there is no lining for the curtain G2, both panels can be reached directly, otherwise pull cords can be secured to their upper parts in any well known manner. Such an assembly is desirable with a body design having a narrow rear curtain or a shallow space for a pocket in the rear body panel.

Figure 22:
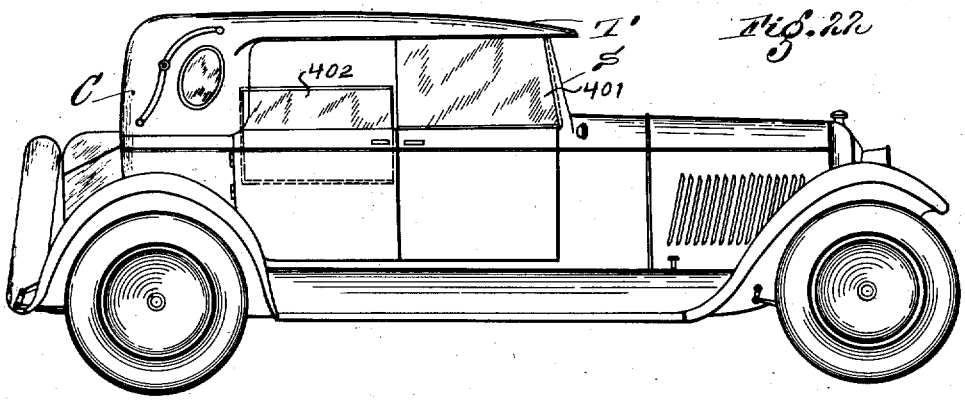
Figure 22 is a side elevation of a modified form of the invention.

Another modification of my invention is illustrated in Figure 22 which represents a body having two windows along its sides. The front margin of the front panel 401 is concealed behind the windshield standard S, while the rear margin of the rear panel is also concealed at all times behind the side curtain C of the top T. It is therefore feasible to frame the windows 401 and 402 upon three sides, leaving only their adjoining margins unbound. Thus the closure panels are reinforced at all times upon three sides, while the appearance of an unbroken transparent wall is retained. Obviously such an arrangement is of especial advantage only in a body of this type, since it can not be applied to a three-paneled body without permitting a portion of the framing to be visible. Of course such an arrangement, or the partial framing to any degree, or the complete framing of any or all panels is within the purview of my invention.

Figure 23:
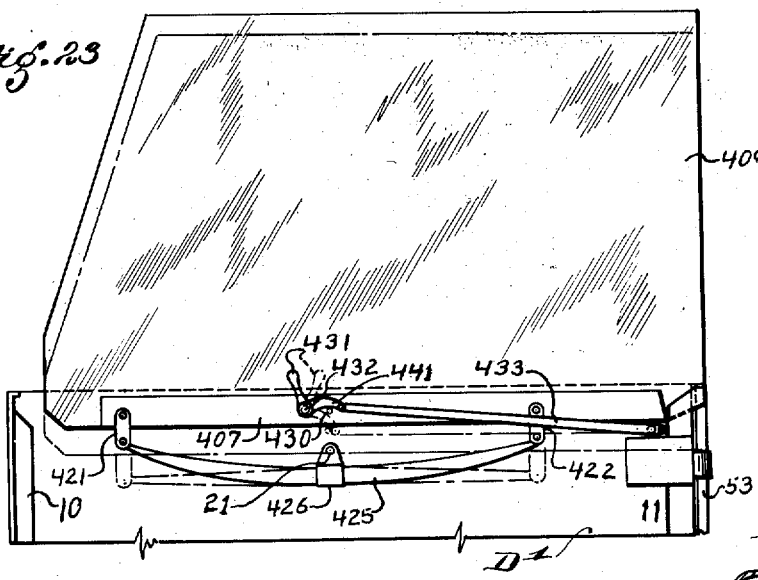
Figure 23 is a view of a portion of a door and associated parts, with the wall of the former broken away, showing a modified form of my invention.

Obviously many variations of the previously described method of disengaging the panels from the top may be employed. For example many other forms of window lifters may be arranged to give a longitudinal movement to the panels or the lifters may be connected with the door latch to lower the window when the latch mechanism is actuated. In Figure 23, I am showing an optional arrangement for disengaging a window 409 which is supported on a lifting mechanism of the type previously described, the stud 21 corresponding to the similarly designated member of Figure 2. The panel assembly in this example is substantially similar to that previously described, one difference being that the upper margin of the panel is unframed and another being that the lower channeled holder is somewhat deeper and need not rise above the door top as does member 7. Near the ends of this holder 407 are the brackets 421 and 422 supported upon the extremities of a leaf spring 425, the mid-portion of which is held in the hanger 426 depending from the stud 21 of the lifting mechanism. Secured just below the middle of the door rail is a pivot 432 supporting an upwardly extending handle 431 which has an integral extension 441 curved downwardly and rearwardly from the pivot and provided with a cam-like lower surface. Pivotally connected to the rear of extension 441 is a rod 433 which is in turn operatively connected to the door latch mechanism. Projecting from the holder 407 is a stud 430 which is located adjacent the extension 441 when the panel is raised. By the rearward movement of the handle 431 the arm 441 is engaged against the stud 430 thereby depressing the spring 425 and lowering the upper margin of the panel out of an appropriate channel in the top, at the same time the door latch is actuated so that the door may be opened. Turning of the outer door handle will similarly operate the mechanism through rod 433. Obviously with this arrangement the channel in the top can have uniform walls and the reinforcing effect of an upper marginal molding is not so essential. Since, upon the release of the handle 431, the spring would tend to force the panel upwardly, the lower surfaces of such a channeled member would preferably be sheathed with metal bearing strips having substantially horizontal lower surfaces, which would hold the glass depressed after its top edge was moved at a slight angle to the groove of the channel member.

Certain features and arrangements disclosed or suggested herein, and/or improvements thereor are illustrated and claimed in my copending applications Serial No. 183,199, filed April 12, 1927; Serial No. 360,105, filed May 3, 1929; and Serial No. 371,162, filed June 15, 1929.

I claim:

1. A vehicle body provided with a top, said top being supported by uprights near its front and having extensions alined with the sides of the body near its rear end, and a continuous opening extending between each of said upright and the corresponding extensions, closure panels movable into said opening to form a continuous transparent wall therein.

2. A closure wall comprising a series of glass panels, each one of which has at least one of its vertical edges unframed and in juxtaposed relation with a similar edge of an adjoining panel.

3. A closure wall for vehicle bodies, said wall comprising a series of panels having transparent adjoining edges which are oppositely beveled and in juxtaposed relation.

4. A closure panel for a vehicle body, said panel being formed of transparent material and having a beveled edge which comprises a surface adjoining one face of the panel and forming a certain angle therewith, and another surface adjoining the opposite face of the panel and forming a different angle therewith.

5. A closure wall for a vehicle body comprising a plurality of transparent plates with transparent edges slightly spaced from each other, cushioned extensions adjoining the edges of the plates serving to maintain their spaced relation.

6. A closure panel supported in a pocket in a vehicle body, said panel being movable upward and endwise, the end wall of the pocket having an opening to permit such a movement.

7. A vehicle body comprising a body wall, a plurality of aligned sections therein each providing a pocket, a single window received in its lowered position in each of said pockets, one of said sections being a door, the window carried by the door having a substantially fixed width of the order of the door width, a lifter for moving each window out of its pocket along a substantially vertical path to a fully raised position and for supporting each window in a plurality of intermediate positions, and guide means cooperating with the lifters and windows and causing the latter in all of their positions to have their adjoining edges both extending in the same general direction as well as causing their edges to be in direct juxtaposition to form a continuous closure wall when the windows are fully raised, said pockets having open upper ends, the fully raised windows having lower portions coinciding with the upper ends of the pockets in their lateral positioning in relation to the body wall.

8. A pair of closure panels separated from each other in inoperative position by structural parts of vehicle body, each panel first being movable from inoperative position for a distance of the order of the height of the panel in a path parallel to that of the other panel and then for a relatively short distance in a path having a component directed toward the other panel, until the panels are brought into a position wherein they are in edge to edge juxtaposition to form a practically continuous closure wall.

9. The combination of a window and a window lifting mechanism, said mechanism including an upper support and a flexible element having a portion extending over said support and a portion depending therefrom, said element being movable whereby various parts thereof are movable from a vertically depending position to a position upon said support, pivot means securing the window to a point on the flexible element, said window being vertically movable when said point is on the depending part of the element and being longitudinally movable when said point is on the portion of the element above the support.

10. A window actuated by a lifting mechanism including a chain and a sprocket, a pivot interposed between said window and a portion of the chain, said window being movable with the chain portion in a vertical and then in a longitudinal path, the window being held by guideways from moving about the pivot during its vertical path and being moved away from said guideways during its longitudinal path and thereupon engaged with other guiding means similarly holding it from pivoting about the chain portion.

11. A door having a glass guiding channel adjacent its end wall, a portion of the bight section of the channel being recessed, and a latch-handle shaft extending through said recess.

12. A hinged vehicle door, a closure panel mounted upon the door, said panel being swingable in relation to the vehicle door about an axis inclined in relation to the lower edge of the panel, so that opposite ends of the lower margin of the panel are movable in substantially opposite directions in relation to the adjoining part of the vehicle door.

13. A vehicle door, a closure panel mounted on the door, said panel being pivotally mounted on said door to swing about an axis inclined in relation to the upper edge of the door and spaced farther from one end of this edge than the other end thereof so that one upper corner may be swung downward substantially the same distance as the other upper corner while moving inwardly a greater distance.

14. A swinging vehicle door, a panel pivotally mounted thereon, a fixed channel normally adapted to engage the upper end of said panel, said panel being automatically pivotable in relation to said door upon the swinging open thereof in order to cause the removal of the upper portion of the panel from the fixed channel.

15. A vehicle body having a swinging door in its side wall and a top with an overhanging portion, a panel pivotally mounted upon the door, a moulding with a rounded outer surface at the upper edge of said panel, a channel upon the overhanging part of the top, said channel being adapted to engage said moulding when the panel is raised, said moulding being releasable from said channel upon the swinging open of the door, the moulding being adapted to turn and slide in said channel during said movement.

16. In a vehicle provided with a side wall, panels thereabove, and an overhanging top, a member located adjacent the side of the top, said member comprising a downwardly disposed channel adapted to engage the top of one of the panels, and an outwardly and upwardly curved longitudinal rib upon said channel located along the top and adapted to comprise a gutter for the same.

17. In a vehicle provided with a side wall, panels thereabove, and an overhanging top, a member located adjacent the side of the top and being formed of yieldable material, said member comprising a downwardly disposed channel adapted to engage the top of one of the panels, and an outwardly and upwardly curved longitudinal rib upon said channel located along the top and adapted to comprise a gutter for the same.

18. In a vehicle body provided with a side wall having a swinging door therein, a panel mounted upon the door and pivotally connected thereto, a top having a portion overhanging the side wall, a downwardly disposed channel upon the overhanging portion of the top, said channel having an inner wall at least a part of which is flexible, the upper margin of the panel being normally engageable in said channel and being swingable past the flexible wall portion upon the opening of the vehicle door whereby the panel may be pivoted in relation to the door so that its upper margin leaves the channel.

19. The subject matter of claim 18 further characterized by the fact that the flexible portion of the inner wall of the channel is toward the hinged end of the door, while the portion above the other end of the door is comparatively rigid, whereby upon pivotal movement of the panel its upper margin is adapted to swing past the first named portion of the wall and slidably to engage the last-named portion thereof.

20. A vehicle body comprising a side wall with a hinged door therein and being provided with a top, a member extending between the body and top and adjoining the hinged end of the door, and a panel slidably mounted in the door and adapted to be moved upwardly and endwise in relation to the door, said member overlapping said panel during its upward and endwise movement.

21. A vehicle body provided with a swinging door, a single closure panel slidably mounted on the door for substantially vertical movement in relation thereto, said door filling an opening of certain width in the side of the vehicle body, said closure panel having a greater width than said opening.

22. A door having its outer wall terminate substantially in alinement with a body upright, an extension of said door lying inward from and adjacent to the upright and a closure panel slidably mounted in the door and having one end carried by the extension of the door, said panel being movable to a raised position above the door, said extension and the end of the raised panel being swingable inwardly away from said upright upon the opening of the door.

23. In a vehicle body, a swinging door, a windshield standard having a rearward inclination and having its lower end adjacent one end of the swinging door, pivot means engaging the upper margin of the vehicle door at a distance from the end adjoining the windshield standard, other pivot means engaging a lower portion of the door, said pivot means together defining an upwardly and rearwardly inclined axis for the swinging door, a closure panel mounted upon the door and having an edge overlapped by the windshield standard the axis of the door being so located that when the door is swung open its front end swings inwardly and the edge of the panel is swung away from the adjoining portion of the windshield standard.

24. A closure panel for the rear portion of the side of a vehicle body, said panel being pivotally connected to the framework of a folding top, and movable from an inoperative concealed position behind the side of the body and an extension of the raised top to a position between the overhanging portion of the top and the body, and being further movable upon the folding of the top to a position wherein a portion thereof is exposed and a portion is concealed behind the side of the vehicle body.

25. A closure panel in a vehicle body supported at its upper edge, the lower edge of the said panel being free to flex slightly, cushion means abutting a portion of its lower margin and adapted to be compressed when the relative movement of parts flexes the adjoining portion of the panel toward said cushion.

26. A vehicle body having a relatively long uninterrupted window opening, spaced pockets in the vehicle body below the window opening, a pair of window lights having their adjacent edges unframed and being slidable from an inoperative position within the pockets to an operative position in the window openings, and means controlling the movement of one of the lights from the inoperative position to the operative position, whereby the adjacent unframed edges of the lights are brought into abutting relation to form a continuous window filling the window opening.

27. A vehicle body having a relatively long uninterrupted window opening, pockets in the vehicle body below the window opening, a pair of window lights having their adjacent edges unframed and each being independently slidable from an inoperative position within the pockets to an operative position in the window opening, and means controlling the movement of the lights from the inoperative position to the operative position, whereby the adjacent unframed edges of the lights are brought into juxtaposed relation to form a continuous window filling the window opening.

28. A vehicle body comprising a door section and an aligned body wall section, each of said sections providing pockets, a transparent closure panel slidable out of each of said pockets to a position thereabove where it is juxtaposed to the other panel to form a closure wall, the panel carried by the door having a width of the order of that of the door, the adjoining edges of the panels being unframed for substantially their entire vertical extents, whereby the panels cooperate in forming a continuous transparent closure wall over the body sections, when they are raised.

29. A vehicle body comprising a door section and an aligned body wall section, each of said sections providing pockets, a transparent closure panel slidable out of each of said pockets to a position thereabove where it is juxtaposed to the other panel to form a closure wall, the panel carried by the door having a width of the order of that of the door, and means for supporting the last-named panel in a plurality of partially raised positions, the adjoining edges of the panels being unframed for substantially their entire vertical extents, whereby the panels cooperate in forming a continuous transparent closure wall over the body sections, when they are raised.

30. A vehicle body comprising a body wall, a plurality of aligned sections therein each providing a pocket, a single window received in its lowered position in each of said pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows and causing the latter in their fully raised positions to have their edges in direct juxtaposition to form a continuous closure closure wall.

31. A vehicle body comprising a body wall, a plurality of aligned sections therein each providing a pocket, a single window received in its lowered position in each of said pockets, one of said sections being a door, the window carried by the door having a width substantially of the order of the door width, a lifter for moving each window out of its pocket along a substantially vertical path to a fully raised position and for supporting each window in a plurality of intermediate positions, and guide means cooperating with the lifters and windows and causing the latter in their fully raised positions to have their edges in direct juxtaposition to form a continuous wall.

32. In a vehicle, a curved body wall, a closure wall thereabove conforming in general to the curvature of the body wall, a series of closure panels forming the closure wall, said panels having transparent beveled edges in overlapping juxtaposition to each other, at least one of said panels being curved so that the plane of its surface merges into that of an adjoining panel, whereby the closure wall may be free from noticeable angular projections of corners.

33. In a vehicle, a body wall, a closure wall thereabove, said wall being formed by a series of closure panels, said panels having unframed edges in overlapping juxtaposition, and cushioning projections holding these edges closely spaced and permitting relative movement longitudinally of marginal portions of the overlapped panels due to body distortion.

34. In a vehicle, a curved body wall including a door, a closure wall thereabove conforming in general to the curvature of the body wall, a series of closure panels forming the closure wall, said panels having transparent beveled edges in overlapping juxtaposition to each other, one of said panels being mounted upon the door and having a width of the order of the door width, said panel being curved, whereby the closure wall may be free from noticeable angular projections or corners.

35. In a vehicle, a closure panel comprising a transparent plate, a frame engaging the lower edge of the panel and supporting the same, one of the vertical edges of the panel being unframed and out of direct supporting engagement with a part of the body, the portion of said panel adjoining said unframed edge being curved to provide a vertical reinforcement for the unsupported edge.

36. In a vehicle body, a closure panel comprising a transparent plate, a frame engaging the lower edge of the panel and supporting the same, a reinforcement extending along the upper edge of the panel, one of the vertical edges of the panel being unframed and out of direct supporting engagement with a part of the body, the portion of said panel adjoining said edge being curved to provide a vertical reinforcement for the unsupported edge, whereby the vertical stiffness of the panel may more nearly approach the longitudinal stiffness afforded by the members extending along its upper and lower edges.

37. In a vehicle body, a closure panel comprising a transparent plate, reinforcements extending along its upper and lower edges, one of its vertical edges being unbound, and cushioning elements carried by the corresponding ends of the reinforcements to hold the unbound edge in spaced relation to the edge of an adjoining panel.

38. In a vehicle body, a closure panel comprising a transparent plate, reinforcements extending along its upper and lower edges, one of its vertical edges being unbound and beveled for juxtaposition to a corresponding portion of an adjoining panel, and cushioning elements carried by the corresponding ends of the reinforcements to hold the unbound edge in spaced relation to the edge of the adjoining panel, the ends of said elements being shaped to correspond to the bevel of the panel edge, but projecting slightly beyond the same.

39. In a vehicle, a body wall, a closure wall thereabove, said wall being formed by a series of closure panels, said panels having unframed beveled edges in overlapping juxtaposition, and cushioning projections holding these edges closely spaced and having surfaces substantially paralleling the bevels of panels, thus permitting relative movement longitudinally of marginal portions of the overlapped panels due to body distortion.

40. A vehicle body comprising a body wall, a plurality of aligned sections therein, each comprising a pocket to receive a panel in its lowered position, one of said wall sections being a door, a panel carried thereby having a width substantially equal to that of the door, a lifter for adjustably positioning said panel in its raised and lowered positions and a plurality of intermediate positions, a lifter similarly arranged to position an adjoining panel, the adjoining edges of each of these panels being unframed, and means cooperating with the lifters in positioning these edges of the panels in overlapping juxtaposition when they are raised.

41. In a vehicle body, a body wall section providing a pocket, a closure panel, means for guiding and positioning the panel in a raised position above the pocket, said panel having edges in juxtaposed parallelism to ends of the pocket during the major portion of its path as it is being guided by said means from its lowered to its raised position, said means being arranged to direct the panel endwise at the upper end of its path, whereby the panel may be disposed over one end of the pocket.

42. In a vehicle body, a body wall comprising a pair of aligned pocket sections having portions separated by structural parts of the body, a pair of panels, each of said panels being movable from inoperative position in a pocket to a raised position, means for guiding said panels during said movement, each panel having a width substantially equal to that of its pocket section and being vertically movable during the major portion of its path, the path of one of said panels having a longitudinally directed component whereby it is brought into juxtaposed relation to the other panel, whereby they form a continuous closure wall.

43. In a vehicle, a swinging door, a closure panel, pivot means connecting the lower portion of the panel to the upper portion of the door, the axis of said means being inclined upwardly toward the hinged end of the door.

44. In a vehicle, a swinging door, a closure panel, pivot means connecting the lower portion of the panel to the upper portion of the door, a top, an inverted channel portion carried by the top above the outer end of the door and arranged to oppose lateral movement of the panel edge when the door is closed, the opening of the door permitting the panel to pivot so that it moves out of the channel portion.

45. In a vehicle, a top, a gypsy curtain having a slanting front edge, and a closure panel slidable from a concealed position wherein one of its edges is substantially in parallel juxtaposition to the slanting curtain edge to an operative position in front of said curtain.

46. In a vehicle, a top, a gypsy curtain having a slanting front edge, and a closure panel slidable from a concealed position wherein one of its edges is substantially in parallel juxtaposition to the slanting curtain edge to an operative position in front of said curtain, said panel being substantially trapezoidal and being slidable along a curved path.

47. A vehicle body comprising a body wall, a pair of pockets therein, panels movable from a lowered position in the pockets to a raised position thereabove, said pockets having adjoining end portions broken away, one of said panels when raised being in engagement with a marginal portion of the other panel when partially raised to guide the latter to its fully raised position where the panels are in juxtaposition to form a closure wall.

48. A vehicle body comprising a body wall, a pair of pockets therein, panels movable from a lowered position in the pockets to a raised position thereabove, said pockets having adjoining end portions broken away, one of said panels when raised being in engagement with a marginal portion of the other panel when partially raised to guide the latter to its fully raised position where the panels are in juxtaposition to form a closure wall, and resilient means holding the panels thus in engagement.

49. A vehicle body comprising a body wall, a pair of pockets therein, end portions of the pockets being broken away, panels movable from a lowered position in said pockets to a raised position thereabove, one of said panels being movable upwardly and longitudinally through one of said broken-away ends to engage the other panel and form a closure wall.

50. A vehicle body comprising a body wall, a pair of pockets therein, end portions of the pockets being broken away, panels movable from a lowered position in said pockets to a raised position thereabove, one of said panels being movable upwardly and longitudinally through said broken-away ends to engage the other panel and form a closure wall, said panel, when thus raised, engaging and acting as a guide for the other panel as it is passing to its fully raised position.

51. A vehicle body comprising a body wall, a pair of pockets therein, end portions of the pockets being broken away, panels movable from a lowered position in said pockets to a raised position thereabove, one of said panels being movable upwardly and longitudinally through one of said broken-away ends to engage the other panel and form a closure wall, a door post between said pockets, the top of said post being below the upper parts of said doors, whereby the panel may move through the broken-away end of the pocket and above the post into juxtaposition with the other panel.

52. A vehicle body including a top and body wall below the top, uprights connected to the front end of the top, extensions of the top being substantially aligned with the rear of the body wall and extending downwardly to the same, a plurality of closure panels supported by the body wall and extending between the same and the top, said panels having glass body portions, said closure panels having juxtaposed transparent edges in overlapping relation to each other, and cooperating to form a continuous transparent closure wall extending from the region of an upright to the corresponding top extension, and cushioning means holding the edges of the glass body portions out of direct contact.

53. A vehicle body including a top and body wall below the top, uprights connected to the front end of the top, extensions of the top being substantially aligned with the rear of the body wall and extending downwardly to the same, a plurality of closure panels supported by the body wall and extending between the same and the top, said panels having glass body portions, said closure panels having juxtaposed transparent edges in overlapping relation to each other, and cooperating to form a continuous transparent closure wall extending from the region of an upright to the corresponding top extension, and cushioning means holding the edges of the glass body portions out of direct contact, said cushioning means being disposed adjoining the upper and lower extremities of the juxtaposed edges of the panels, the overlapping glass margins being disposed in closely spaced relation therebetween.

54. A vehicle body including a top and body wall below the top, uprights connected to the front end of the top, extensions of the top being substantially aligned with the rear of the body wall and extending downwardly to the same, and a plurality of closure panels supported by the body wall and extending between the same and the top, said panels having body portions formed of substantially rigid and self-maintaining material, said closure panels having juxtaposed transparent edges in overlapping relation to each other, and cooperating to form a continuous transparent closure wall extending from the region of an upright to the corresponding top extension.

55. A vehicle body provided with a top and having a swinging door in its side, a panel carried by the door, channel means upon the top having a wall in engagement with the upper edge of the panel and holding it against outward movement, means associated with the door permitting the movement of the panel relative thereto, said means being arranged to be automatically operable upon the swinging open of the door to move the panel upper edge downwardly out of its normal relation to the channel wall, whereby the panel is released from the channel.

56. A vehicle body provided with a top and having a swinging door in its side, a panel carried by the door, channel means upon the top having a wall in engagement with the upper edge of the channel and holding it against outward movement, means associated with the door permitting the movement of the panel relative thereto, said means being arranged to be automatically operable upon the swinging open of the door to move the panel upper edge downwardly out of its normal relation to the channel wall, whereby the panel is released from the channel, said means being automatically operable upon closing of the door to reinsert the panel edge into the channel means.

57. In a vehicle body, a body wall providing a pair of pockets, a closure panel slidable out of an inoperative position in one of the pockets to a raised position thereabove, a cushioning element having a coefficient of friction higher than that of glass upon the edge of said panel, a second closure panel slidable out of inoperative position in the other of said pockets to a raised position thereabove, said second panel having a glass edge portion, means for supporting the panels and holding them in edge to edge juxtaposition when both are raised, said cushioning element upon the first panel slidably engaging the glass edge of the other panel when one of said panels is raised and the other is being raised, the low coefficient of friction of the glass edge preventing the cushioning element from affording undesirable resistance to this movement.

58. A vehicle body comprising a body wall providing a pair of pockets, a pair of closure panels, each of said panels being movable out of one of said pockets to a raised position above the body wall, means for lifting and guiding the panels, a cushioning element projecting from one of the panels, the panels when raised being disposed in edge to edge juxtaposition with the cushioning element engaging an edge portion of the other panel and holding adjoining panel surfaces closely spaced from each other, the panels being slidable in a generally vertical direction during the major portion of their movement out of the pockets, and one of the panels being movable in a substantially endwise direction at the upper end of its path to bring the cushioning element into engagement with the panel edge portion without rubbing engagement therebetween.

59. A vehicle body comprising a body wall providing a pair of pockets, a pair of closure panels, each of said panels being movable out of one of said pockets to a raised position above the body wall, means for lifting and guiding the panels, cushioning elements carried by adjoining edge portions of said panels, the panels when raised being disposed in edge to edge juxtaposition with the cushioning elements in mutual engagement and holding adjoining panel surfaces closely spaced from each other, the panels being slidable in a generally vertical direction during the major portion of their movement out of the pockets, and one of the panels being movable in a substantially endwise direction at the upper end of its path to bring the cushioning elements into mutual engagement without necessitating their engagement with other parts of the adjoining panels.

60. A vehicle body comprising a body wall, a plurality of aligned sections therein each providing a pocket, a single window received in its lowered position by each of said pockets, one of said sections being a door, the window carried by the door having a substantially fixed width of the order of the door width, a lifter for moving that window out of the door pocket to a raised position and for supporting the window in that position as well as in a plurality of intermediate positions, and guide means cooperating with the lifter and windows and causing the latter in their fully raised positions to have their edges in direct juxtaposition to form a continuous closure wall, a window adjoining the door being directed by the guide means in a curved path between its lowered position and its raised position in juxtaposition to the panel carried by the door.

61. A vehicle body comprising a body wall, a plurality of aligned sections therein each providing a pocket, a single window received in its lowered position by each of said pockets, one of said sections being a door, the window carried by the door having a substantially fixed width of the order of the door width, a lifter for moving that window out of the door pocket to a raised position and for supporting the window in that position as well as in a plurality of intermediate positions, and guide means cooperating with the lifter and windows and causing the latter in their fully raised positions to have their edges in direct juxtaposition to form a continuous closure wall, the pockets providing slots in the top of the body wall, said slots and the upper parts of the pockets being in communication with each other to permit the window edges to be in juxtaposition.

62. A vehicle body including a top and body wall below the top, said body wall including a swinging door and an adjoining section, uprights connected to the front end of the top, extensions of the top being substantially aligned with the rear of the body wall and extending downwardly to the same, and a plurality of closure panels supported by the body wall and extending between the same and the top, one of said panels being carried by the door, one of said panels being carried by said adjoining section, said closure panels having body portions formed of substantially rigid and self-maintaining transparent material and having juxtaposed transparent edges in overlapping relation to each other, the closure panels thus cooperating to form a continuous transparent closure wall extending from the region of an upright to the region of a corresponding top extension.

63. A vehicle body including a top and body wall below the top, said body wall including a swinging door and an adjoining section, uprights connected to the front end of the top, extensions of the top being substantially aligned with the rear of the body wall and extending downwardly to the same, a plurality of closure panels supported by the body wall and extending between the same and the top, one of said panels being carried by the door, one of said panels being carried by said section, the two last-named panels having body portions formed of glass, cushioning means on the edge of one of these panels engaging the other panel and preventing their glass body portions from contacting, said closure panels having juxtaposed transparent edges in overlapping relation to each other, and cooperating to form a continuous transparent closure wall extending from the region of an upright to the region of a corresponding top extension.

64. A vehicle body comprising a curved body wall, a plurality of adjoining sections therein each providing a pocket, a single window received in its lowered position in each of said pockets, one of said sections being a door, the window carried by the door having a width substantially of the order of the door width, a lifter for moving that window out of the door pocket to a raised position and for supporting it in that position as well as a plurality of intermediate positions, and guide means cooperating with the lifter and windows and causing the latter in their fully raised positions to have their edges in direct juxtaposition to form a continuous closure wall, one of the windows being curved and having its marginal portion extending in practically the same direction as the marginal portion of the adjoining window, thereby avoiding a noticeable angular projection at the edges of the windows.

65. A vehicle body comprising a body wall, a pair of aligned sections therein, each providing a pocket with an open upper end, a single window received in its lowered position by each of said pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows and causing the latter in their fully raised positions to have marginal portions in direct contact, each of said windows having a transparent body portion, the major portions of the adjoining edges of the windows being fixed in relation to their respective body portions throughout the paths of the windows, said windows when fully raised having lower portions positioned laterally of the body wall to coincide with the open ends of their respective pockets, whereby a continuous closure wall may be provided by a pair of windows, one of which is carried by each of said sections, without necessity of intervening parts, relatively movable window sections or the like.

66. A vehicle body comprising a body wall, a pair of aligned sections therein, each providing a pocket with an open upper end, a single window received in its lowered position by each of said pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows and causing the latter in their raised positions to have marginal portions in direct contact, each of said windows having a transparent body portion, frame elements engaging the lower parts of the body portions, the contacting marginal portions being fixedly connected to said frame elements, said windows when fully raised having lower portions positioned laterally of the body wall to coincide with the open ends of their respective pockets, whereby a continuous closure wall may be provided by a pair of windows, one of which is carried by each of said sections, without necessity of intervening parts, relatively movable window sections or the like.

67. A vehicle body comprising a body wall, a pair of aligned sections therein, each providing a pocket with an open upper end, a single window received in its lowered position by each of said pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows and causing the latter in their raised positions to have marginal portions in direct contact, each of said windows having a transparent body portion, frame elements engaging parts of the body portions, the contacting marginal portions being fixedly connected to said frame elements, at least one of said marginal portions including a distortable cushioning element that is compressed when it contacts with the adjoining window, said windows when fully raised having lower portions positioned laterally of the body wall to coincide with the open ends of their respective pockets, whereby a continuous closure wall may be provided by a pair of windows, one of which is carried by each of said sections, without necessity of intervening parts, relatively movable window sections or the like.

68. A vehicle body comprising a body wall, a pair of aligned sections therein, each providing a pocket with an open upper end, a single window received in its lowered position by each of said pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows and causing the latter in their fully raised positions to have marginal portions in direct contact, each of said windows having a transparent body portion, the major portions of the adjoining edges of the windows being fixed in relation to their respective body portions throughout the paths of the windows, said windows when fully raised having lower portions positioned laterally of the body wall to coincide with the open ends of their respective pockets and having their adjoining edges both extending in the same general direction throughout their paths, whereby a continuous closure wall may be provided by a pair of windows, one of which is carried by each of said sections, without necessity of intervening parts, relatively movable window sections or the like.

69. A vehicle body comprising a body wall with a front pocket and an adjoining pocket therein separated by a structural part of the wall, a front window panel movable out of the front pocket to a position thereabove, a second window panel movable out of the adjoining pocket to a position thereabove, an upwardly and rearwardly inclined post member adjoining the front panel, guiding means for the panels directing them in generally vertical paths, the path of the front panel having a component directed toward the second panel, so that the adjoining panel edges are directly juxtaposed and the raised panels cooperate in forming a closure wall bridging the space above said structural part, a part of said post and the front margin of the front panel being in overlapping engagement during the movement of the front panel upwardly and toward the second panel.

70. In a vehicle body, a body wall including a door section and an aligned section, said sections providing pockets separated by a structural part of the body wall, a pair of windows, lifting and guiding means for said windows, said means directing each window along a continuous, upwardly directed path from a concealed position in one of said pockets, wherein the end of the window is disposed in the end of its pocket to a raised position wherein the end of the window is directly juxtaposed to the end of the other window, the path of one window having a relatively large vertically directed component and a relatively small horizontal component directed toward the other window to cause the raised windows to bridge the space above said structural part of the body wall.

71. In a vehicle body, a body wall including a door section and an aligned section, each of said sections providing a pocket, a pair of panels, each of said panels being movable out of one of said sections to a raised position, lifting and guiding means for said panels, the panels each having glass portions with their adjoining transparent edges unframed, said edges when the panels are raised being in spaced, generally overlapping relation, whereby the panels cooperate in affording a transparent closure panel assembly, uninterrupted by opaque posts or the like.

72. A vehicle body comprising a side wall with a door therein, a top, an upwardly and rearwardly inclined post member extending upwardly to the top at the front of the door, and a panel slidably mounted on the door and having a generally vertical path with a rearwardly directed component to bring the panel when raised into edge to edge juxtaposition with an adjoining panel, the post member having a part overlapping and concealing the front edge of the panel during its upwardly and rearwardly directed path.

73. A vehicle body comprising a body wall, a pair of aligned sections therein, each providing a pocket, a single window received in its lowered position in each of the pockets, one of said sections being a door, the window carried by the door having a width substantially of the order of the door width, a lifter for moving that window out of the door pocket to a raised position and for supporting the window in that position as well as in a plurality of intermediate positions, and guide means cooperating with the lifter and windows, said windows being disposed in spaced relation when lowered and being guided along generally upwardly directed paths from their lowered position, the path of one of the windows having a component directed toward the path of the other window, so that the edges of the fully raised windows are in direct juxtaposition to permit the windows to form a continuous closure wall.

74. A vehicle body comprising a body wall, a pair of aligned sections therein, each providing a pocket, a single unitary window received in its lowered position in each of the pockets, one of said sections being a door, the window carried by the door having a width substantially of the order of the door width, a lifter for moving that window out of the door pocket to a raised position and for supporting the window in that position as well as in a plurality of intermediate positions, said windows having edge portions fixedly connected to their transparent body portions and having practically the same respective areas in all positions, said guide means directing the windows along generally upwardly extending paths so that their adjoining edge portions follow converging paths whereby the windows when raised have their edges in direct juxtaposition to form a continuous closure wall without necessity for intervening posts, relatively sliding panel or window sections or the like.

75. A vehicle body comprising a body wall, a pair of aligned sections therein, each providing a pocket, a single window received in its lowered position in each of the pockets, one of said sections being a door, the window carried by the door having a width substantially of the order of the door width, a lifter for moving that window out of the door pocket to a raised position and for supporting the window in that position as well as in a plurality of intermediate positions, guide means cooperating with the lifter to direct that window along a generally upwardly extending path having a rearwardly directed component to bring the edge of the window carried by the door into direct juxtaposition with the edge of the adjoining window when both windows are raised, thus to afford a continuous closure wall, and an upwardly and rearwardly extending post at the front of the door having a part overlapping and concealing the margin of the window carried by the door during its upwardly and rearwardly directed path.

76. A vehicle body comprising a side wall with a hinged door therein, a top above the side wall, a rearwardly inclined post extending upwardly between the wall and top, and a panel slidably mounted in the door and movable upwardly and rearwardly, said post having a part in engagement with said panel during its upward and rearward movement.

77. A vehicle body comprising a body wall, a pair of pockets therein, a pair of panels, each independently movable out of one of the pockets to a raised position thereabove, said pockets having adjoining end portions broken away, guiding means directing each panel along its path irrespective of the positioning of the other panel, each of said panels when fully raised being in engagement with a marginal portion of the other panel to assure proper relative positioning of the margins if the panels and aid said means in guiding the other panel to fully raised position wherein the panels are in direct juxtaposition to form a closure wall.

78. In a vehicle body, a body wall including a door section and an aligned section, said sections providing pockets separated by a structural part of the body wall, a pair of unitary windows movable out of separated positions in the respective pockets, said windows having glass body portions and edge portions fixedly related thereto, lifting and guiding means for said windows, said means directing said windows so that their adjoining edge portions follow converging paths to bring them into direct juxtaposition.

79. In a vehicle body, a body wall including a door section and an aligned section, said sections providing pockets separated by a structural part of the body wall, a pair of unitary windows movable out of separated positions in the respective pockets, said windows having glass body elements and adjoining edge portions fixedly connected to their body portions, one of said elements being in the form of a distortable element, guiding and lifting means for said windows, said means directing the windows so that their adjoining edge elements follow converging paths into direct contact wherein said distortable element is normally distorted by contact with the adjoining window, said structural part including an end wall of a pocket with an opening therein, said opening permitting the windows thus to move into contact and permitting the window edges to slide in mutual engagement when both windows are near the upper ends of their paths, whereby the windows form a closure wall without necessity for intervening posts, relatively sliding panel or window sections or the like.

80. In a vehicle body, a body wall section providing a pocket, a closure panel, means for guiding and positioning the panel in a raised position above the pocket, said panel having edges in juxtaposed parallelism to ends of its pocket as it is being guided by said means from its lowered to its raised position, said means being arranged to direct the panel endwise at the upper end of its path, and a single manually actuable control handle operatively connected with said means and movable to effect the upward and endwise movement of the panel, whereby, due to continued actuation of the handle, the panel may be moved upwardly and then endwise so that at the end of its path it is disposed over one end of the pocket.

RAYMOND L. CARR.